(12) United States Patent
Hermann et al.

(10) Patent No.: US 9,975,067 B2
(45) Date of Patent: May 22, 2018

(54) MEMBRANE FOR A MEMBRANE FILTER PLATE AND ARRANGEMENT OF TWO FILTER PLATES

(71) Applicant: JVK Filtration Systems GmbH, Georgensgmund (DE)

(72) Inventors: Manfred P Hermann, Nuremberg (DE); Bernhard Salbaum, Rottenbach (DE)

(73) Assignee: JVK Filtration Systems GmbH, Georgensgmund (DE)

(*) Notice: Subject to any disclaimer, the term of this patent is extended or adjusted under 35 U.S.C. 154(b) by 350 days.

(21) Appl. No.: 14/418,211

(22) PCT Filed: Jul. 25, 2013

(86) PCT No.: PCT/EP2013/065674
§ 371 (c)(1),
(2) Date: Jan. 29, 2015

(87) PCT Pub. No.: WO2014/019921
PCT Pub. Date: Feb. 6, 2014

(65) Prior Publication Data
US 2015/0182883 A1    Jul. 2, 2015

(30) Foreign Application Priority Data
Jul. 30, 2012    (DE) .................... 20 2012 007 354 U (51) Int. Cl.
*B01D 29/05*    (2006.01)
*B01D 25/164*    (2006.01)
(Continued)

(52) U.S. Cl.
CPC ......... *B01D 29/05* (2013.01); *B01D 25/1645* (2013.01); *B01D 25/215* (2013.01); *B01D 25/302* (2013.01)

(58) Field of Classification Search
None
See application file for complete search history.

(56) References Cited

U.S. PATENT DOCUMENTS

| 3,737,041 A | 6/1973 | Kitajima et al. ............... 210/228 |
| 4,746,429 A | 5/1988 | Stanik ........................... 210/231 |

(Continued)

FOREIGN PATENT DOCUMENTS

| DE | 20 2005 006 681 | 8/2006 | ........... B01D 25/168 |
| JP | S51-082185 | 12/1974 | |

(Continued)

OTHER PUBLICATIONS

International Preliminary Report on Patentability for International Application No. PCT/EP2013/065674, dated Feb. 5, 2015.
(Continued)

*Primary Examiner* — Chester T Barry
(74) *Attorney, Agent, or Firm* — Kusner & Jaffe (57) ABSTRACT

A membrane for a membrane filter plate, having an elastic compression face and a peripheral fastening means. The membrane displays an elastic compression face and a peripheral fastening means. An opening for a fluid communication into a filter chamber is configured in the membrane. The invention furthermore relates to an arrangement of at least two filter plates of which one filter plate is a membrane filter plate having a membrane. One membrane is fastened on the first filter plate by means of the peripheral fastening means such that a compression means chamber is formed between the membrane and the first filter plate. The second filter plate bears on the first filter plate such that a filter chamber is formed between the compression face of the membrane and the second filter plate. At the periphery of the filter plates, a duct is formed between the filter plates.

9 Claims, 6 Drawing Sheets

(51) Int. Cl.
B01D 25/21 (2006.01)
B01D 25/30 (2006.01)

(56) References Cited

U.S. PATENT DOCUMENTS

| | | | |
|---|---|---|---|
| 6,852,220 B1 | 2/2005 | Grafen et al. | 210/229 |
| 7,790,027 B2 | 9/2010 | Hermann | 210/228 |
| 2003/0032315 A1* | 2/2003 | Narui | H01R 43/007 |
| | | | 439/86 |

FOREIGN PATENT DOCUMENTS

| | | | | |
|---|---|---|---|---|
| JP | A-S53-119473 | 10/1978 | | B01D 25/12 |
| JP | S53-119473 | 10/1978 | | B01D 25/12 |
| JP | S62-019215 | 1/1987 | | B01D 25/12 |
| JP | H07-232009 A | 9/1995 | | B01D 25/12 |
| JP | H10-146502 A | 6/1998 | | B01D 25/12 |
| JP | 2003-514651 A | 4/2003 | | B01D 25/12 |
| JP | 2005-177574 A | 7/2005 | | B01D 25/12 |
| WO | WO 01/37964 | 5/2001 | | B01D 25/21 |
| WO | WO 03/095063 | 11/2003 | | B01D 25/21 |
| WO | WO 2004/067143 | 8/2004 | | B01D 25/21 |

OTHER PUBLICATIONS

Office Action issued in related Japanese Patent Application No. 2015-524728 dated Mar. 15, 2016 (English-language translation provided).
Office Action issued in related Korean Patent Application No. 2015-7005038 dated Jul. 11, 2016 (English-language translation provided).
Office Action issued in corresponding Japanese Patent Application No. 2015-524728 dated Dec. 6, 2016 (English-language translation provided).
International Search Report for International Application No. PCT/EP2013/065674, dated Apr. 10, 2013.
English-language translation of Decision of Rejection issued in corresponding Japanese Patent Application No. 2015-524728 dated May 16, 2017.

\* cited by examiner

MEMBRANE FOR A MEMBRANE FILTER PLATE AND ARRANGEMENT OF TWO FILTER PLATES

FIELD OF THE INVENTION

The present invention relates to a membrane for a membrane filter plate, having an elastic compression face and a peripheral fastening means. The invention furthermore relates to an arrangement of at least two filter plates of which one filter plate is a membrane filter plate having a membrane.

BACKGROUND OF THE INVENTION

It is known to form a filter stack for a filter press which is composed of a plurality of filter plates which are disposed beside one another in pairs. Filter chambers are in each case formed between the filter plates. To this end, the filter plates display a central filter face and a thicker sealing periphery which frames the central filter face. The filter plates in the filter press can be displaced away from and toward one another, by way of which the filter chambers can be opened and closed.

Each filter chamber typically displays at least one inlet and one outlet. The suspension to be filtered which is typically referred to as sludge, flows via the inlet into the filter chamber. The suspension is then filtered by means of a filter cloth, wherein the solid matter is retained by the filter cloth in the filter chamber, such that a so-called filter cake is created. The filtrate which has been freed from the particulate matter is then conducted via the outlet out of the filter chamber.

In order to reduce the residual humidity in the filter cake and to shorten the filtration times, filter presses in which a filter plate displays a membrane which delimits the filter chamber from one side are known. Such a filter plate is referred to as a membrane filter plate. In the case of a filter press having membrane filter plates the press filtration which is initially carried out is succeeded by a compressive filtration in which the elastic membranes of the filter chambers are impinged by a pressure medium, such that said elastic membranes constrict the space in which the filter cake is situated. The filter cake is compressed in this manner, on account of which the cavities of the filter cake are decreased and on account of which the residual humidity in these cavities is further reduced.

Such a filter press is described in WO 03/095063 A1, for example. In the case of the filter press described therein, a plate stack which alternatingly displays a filter plate and a membrane filter plate is formed. The filter plate on both sides displays in each case one filter cloth which is fastened in each case in a clearance of the main body of the filter plate. The membrane filter plate on both sides displays in each case one membrane which is fastened on the main body.

In the case of this plate stack, inflow of the sludge into the filter chamber takes place via an inlet duct in the filter plate which does not comprise the membrane. This inlet duct leads from the end side of the filter plate through the plate periphery into the interior of the filter plate. There, the inlet duct terminates in a T-shaped end piece which is closed off by two inlet openings. The two inlet openings connect the inlet duct to two filter chambers which lie on averted sides of the filter plate. At the filter chamber the membrane of the membrane filter plate is disposed so as to be opposite the inlet opening, wherein the membrane in this region is configured to be planar, on account of which entry of the membrane into the inlet opening, given a sufficiently high pressure, is prevented.

Another possibility for conducting the sludge into the filter chamber is described in WO 2004/067143 A1. In this case a filling shoe is held between two filter plates between which the filter chamber is configured. A duct through which the sludge can be conducted from outside into the filter chamber is formed in the filling shoe. The filling shoe displays an outlet which is oblate on both sides and a connector which is attached thereon in an oblique manner. The filling shoe is inserted into a receptacle of one filter plate. This receptacle is adapted to the shape of the connector of the filling shoe, but displays slight play in relation thereto. The membrane of a membrane filter plate is disposed above the filling shoe. Therebelow, the filling shoe bears on the other filter plate and is supported by the latter. If the filling shoe is to be removed, the two filter plates in the filter press are moved apart. During this opening of the filter chamber the filling shoe tilts in the receptacle of the filter chamber, such that said filter shoe does not fall out. The filter shoe can readily be lifted by hand and thereafter slides out from the receptacle.

It has now emerged that in the case of arrangements in which a separate inlet part which is disposed between the filter plates is used for conducting the sludge into the filter chamber, contamination of the joints between the inlet part and the membrane may occur. Moreover, the soft membrane may be damaged by the rigid inlet part. There is furthermore the risk of the inlet duct of the inlet part being clogged, in particular if said inlet duct displays a kink. There is finally the problem of the inlet part having to be tightly received between the neighboring filter plates in order to avoid liquid leaking from the filter chamber, in particular when a very high pressure is exerted on the filter cake and the residual sludge in the filter chamber. Finally, the separate inlet part is difficult to mount.

SUMMARY OF THE INVENTION

The present invention is therefore based on the object of providing a membrane and an arrangement of the type mentioned at the outset by means of which it is possible for sludge to be conducted into a filter chamber between two filter plates but in which damage to the membrane and contamination of the joints at the membrane are avoided. Moreover, the filter chamber should be able to be reliably sealed toward the outside and clogging to the duct into the filter chamber should be prevented.

This object is achieved according to the invention by a membrane and an arrangement as recited in the independent claim(s). Advantageous design embodiments and refinements are derived from the dependent claims.

The membrane according to the invention, which is suited to a membrane filter plate, displays an elastic compression face and a peripheral fastening means. Furthermore, an opening for a fluid communication into a filter chamber is configured in the membrane.

The opening for the fluid communication into the filter chamber is conventionally provided so as to be separate from the membrane. For example, the inlet opening is provided opposite the membrane by the filter plate which is opposite the membrane filter plate, as is shown in WO 03/095036 A1, for example. It is furthermore known for a separate filling part which provides the fluid communication into the filter chamber to be received between two filter plates. According to the invention this opening is provided by the membrane itself, so that a separate inlet part or a separate configuration of the inlet in the filter plate itself is not required. In this case, damage to the membrane by an adjoining separate inlet part advantageously cannot arise. Also, no joints which could be contaminated result between the membrane and an inlet part. Moreover, a more reliable sealing of the filter chamber toward the outside can be ensured, since it is not necessary for a separate inlet part to be sealed in relation to the membrane. The risk of leakage from the filter chamber is thus reduced.

According to one design embodiment of the membrane according to the invention, said membrane displays a duct element which extends from the plane which is formed by the membrane and in which the opening is configured. This duct element in particular is configured so as to be integral with the compression face and/or the fastening means. In particular, the duct element and the compression face and/or the fastening means are composed of the same material. On account thereof it is achieved that the membrane which provides the opening for the fluid communication into the filter chamber can be manufactured in a cost-effective manner. It is at the same time achieved that no further add-on parts are required for creating the fluid communication into the filter chamber. Finally, the integral configuration of the membrane and the duct element ensures sealing of the filter chamber toward the outside. The membrane according to the invention may thus provide an integrated sludge inlet in the case of a plate stack. The inlet may furthermore be formed at any arbitrary point of the membrane and thus of the filter plate.

According to a further design embodiment of the membrane according to the invention, the duct element is disposed in the peripheral region of the membrane. On account thereof, a secure and locationally fixed positioning of the duct element is ensured.

The peripheral fastening means in particular is an encircling bead which is situated on that side of the membrane on which the membrane is fastened on the membrane filter plate and at which a compression-means chamber is formed. The duct element in this case is formed on the other side of the membrane, that is to say on that side of the membrane which delimits the filter chamber at the elastic compression face. The duct element is thus disposed in particular with respect to the plane formed by the membrane so as to be opposite the fastening means. In this case a thickening of the membrane, which on one side forms the peripheral fastening means and on the other side the duct element having the opening for the fluid communication into the filter chamber, thus occurs. Also on account thereof, a secure and locationally fixed positioning of the duct element is ensured.

According to a further design embodiment of the membrane according to the invention, a membrane duct which opens out in the opening and by way of which liquid is conductible into the filter chamber or from the filter chamber is formed in the duct element. By way of this membrane duct, the sludge in particular can be conducted into the filter chamber.

The invention furthermore comprises a membrane filter plate having a membrane such as has been described above.

In the case of the arrangement according to the invention of at least two filter plates, a membrane such as has been described above is fastened on the first filter plate by means of the peripheral fastening means such that a compression-means chamber is formed between the membrane and the first filter plate. The first filter plate is thus a membrane filter plate. The second filter plate bears on the first filter plate such that a filter chamber is formed between the compression face of the membrane and the second filter plate. At the periphery of the filter plates a duct is formed between the filter plates, which duct is in fluid communication with the opening of the membrane, such that liquid is introducible into the filter chamber from outside through the duct via the opening of the membrane, or, from the filter chamber through the opening of the membrane and the duct, liquid is conductible out of the filter chamber. The duct configured between the filter plates is thus continued within the membrane and opens out in the filter chamber. In this manner, in particular the sludge can be conducted into the filter chamber without further add-on parts which delimit the filter chamber being necessary. Advantageously, no joints thus result between the membrane and further add-on parts. Moreover, there is also no risk of damage to the membrane by further add-on parts which provide an inlet opening for the sludge. Finally, on account thereof, mounting of the arrangement is facilitated, since no separate part for the sludge inlet has to be inserted between the two filter plates.

In the case of the arrangement according to the invention, the membrane in particular is configured so as to be smooth. Also, no filter cloth is disposed at the membrane. In contrast, a filter cloth may be disposed at the second filter plate, such that the filter chamber is delimited by the membrane, on the one hand, and by the filter cloth, on the other hand.

According to a further design embodiment of the arrangement according to the invention, the membrane, such as has been described above, displays a duct element in which the opening is configured. In this case the arrangement may further comprise a connection element, for example an inlet connector, which is received by the duct element of the membrane. The connection element is in particular disposed so as to be sealed in the membrane duct of the duct element. Alternatively, the connection element is received in the duct which is formed between the filter plates. However, the connection element does not delimit the filter chamber, such that the risk of contamination of the joints between the connection element and adjoining parts by the press filtration is reduced.

Furthermore, the connection element may display a mouth opening at the narrow sides of the filter plates. The sludge can be conducted in the direction of the filter chamber via this mouth opening.

BRIEF DESCRIPTION OF THE DRAWINGS

The invention is now explained by means of an exemplary embodiment with reference to the drawings, in which.

DETAILED DESCRIPTION OF THE INVENTION

In the case of a filter press a filter stack is formed from a plurality of filter plates. In a filter stack for press filtration, one filter plate and one membrane filter plate may be alternatingly disposed in a filter stack. In the present exemplary embodiment, however, two identical membrane filter plates are used. The membrane filter plates display an encircling, comparatively thick periphery at which neighboring plates bear on one another. In the center between the plates a filter chamber and a compression-means chamber which are separated by the membrane of the membrane filter plate are formed.

In the following an exemplary embodiment of the filter plate according to the invention and the arrangement of the filter plates will be explained with reference to FIGS. 1 to 5, wherein in each case only the peripheral region of the filter plate or the arrangement, respectively, at the inlet for the sludge into the filter chamber is illustrated.

In the case of the arrangement a first filter plate 1 bears on a second filter plate 2. A membrane 3 is fastened on the first filter plate 1, such that, between the membrane 3 and the second filter plate 2, a filter chamber 4 and, between the membrane 3 and the first filter plate 1, a compression-means chamber 5 is formed in a manner which is known per se. The first filter plate 1 is thus a membrane filter plate. A filter cloth 17 which is situated in the filter chamber 4 is disposed in a manner which is known per se between the first 1 and the second 2 filter plate.

The second filter plate 2 is profiled at the filter cloth 17, such that filtration may take place through the filter cloth 17 and the channels of the profile of the second filter plate 2. In contrast, the membrane 3 is smooth. No filter cloth is provided here.

The overall shape of the planar membrane 3 is adapted to the shape of the filter plates 1 and 2. Said membrane is substantially rectangular, having rounded corners, for example. The membrane 3 is composed from a thermoplastic material. Said membrane 3 in particular is elastic in the inner region which is adjacent to the filter chamber 4 and the compression-means chamber 5, such that in the case of an impingement of the compression-means chamber 5 with a compressive medium, the membrane 3 is pushed in the direction of the filter chamber 4, in order to exert a compressive pressure on the filter cake in the filter chamber 4 during the operation in a filter press. A substantially planar elastic compressive face 6 which delimits the filter chamber 4 is thus formed in the interior of the membrane 3. The membrane 3 of the exemplary embodiment described serves only for exerting a compressive pressure, that is to say that said membrane 3 is not for filtration and thus also does not display a filter cloth.

In particular at the compression face 6, the membrane 3 forms a plane E. In the peripheral region of the membrane 3 an encircling bead 7 which extends away from the membrane 3 in a direction which is perpendicular to the plane E is formed as a means for fastening the membrane 3 on the first filter plate 1, that is to say on the membrane filter plate. When the membrane 3 is fastened on the filter plate 1, the bead 7 for fastening of the membrane 3 is received in a groove of the filter plate 1. In this case a releasable connection between the membrane 3 and the filter plate 1 is produced. However, it would also be possible for the membrane 3 to be unreleasably fastened on the filter plate 1 by means of other fastening means. For example, the membrane 3 may be peripherally welded to the filter plate 1.

On the other side of the membrane 3, that is to say on the side of the compression face 6, a duct element 8 extends from substantially opposite the bead 7, from the plane E which is formed by the membrane 3. A membrane duct 10 is formed within the duct element 8, which membrane duct 10 extends substantially parallel to the plane E from the outside to the inside, up to an opening 9 which in the case of the arrangement according to the invention is situated at the filter chamber 4. The opening 9 and the membrane duct 10 thus create a fluid communication into the filter chamber 4, via which in particular sludge can be conducted into the filter chamber 4.

All parts of the membrane 3, that is to say the compression face 6 and the planar region of the membrane 3, which forms the compression face 6, and the bead 7 and the duct element 8 are configured so as to be integral and are composed from the same material.

The duct element 8 in the case of the arrangement according to the invention is jammed between the first filter plate 1 and the second filter plate 2. At the outermost face 11 of the duct element 8, the latter bears on the second filter plate 2, wherein optionally the filter cloth 17 is additionally also jammed between the outermost face 11 of the duct element 8 and the second filter plate 2. Here, a liquid-tight delimitation of the filter chamber 4 is created.

According to a further design embodiment of the membrane 3 according to the invention, the latter displays a plurality of openings 9 for a fluid communication into the filter chamber 4. In this case, in particular a plurality of separate duct elements 8 which in each case comprise membrane ducts 10 and openings 9 into the filter chamber 4 are configured.

Radially outside of the duct element 8 a duct 12, which is in fluid communication with the membrane duct 10 and thus with the filter chamber 4, is formed between the peripheral regions of the filter plates 1 and 2. A connection element 13, for example an inlet connector, is inserted into this duct 12. The connection element 13 extends into the membrane duct 10, where the former is sealed toward the duct element 8 by way of seals 15. On the outside the connection element 13 terminates in a mouth opening 14.

Figure 1:
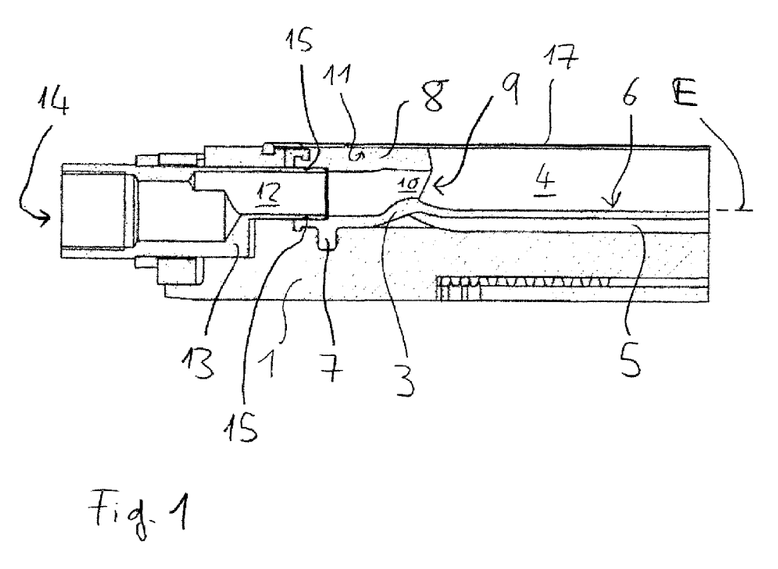
FIG. 1 shows a first sectional view of the peripheral region of the exemplary embodiment of the filter plate according to the invention which comprises an exemplary embodiment of the membrane according to the invention.
Figure 2:
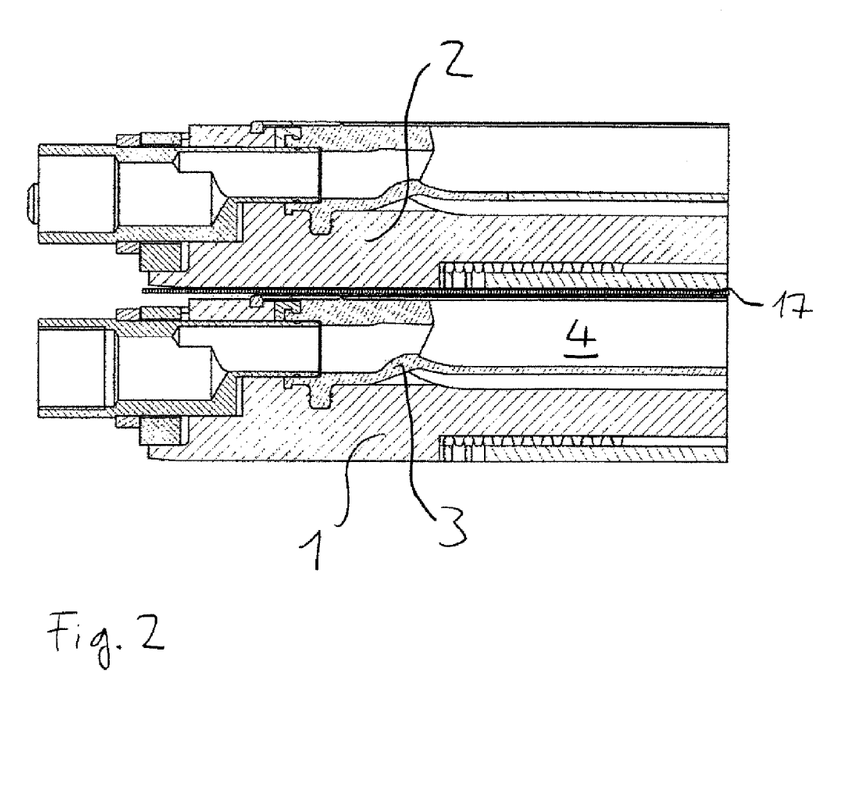
FIG. 2 shows a sectional view of the peripheral region of the exemplary embodiment of the arrangement according to the invention which comprises an exemplary embodiment of the membrane according to the invention.
Figure 3:
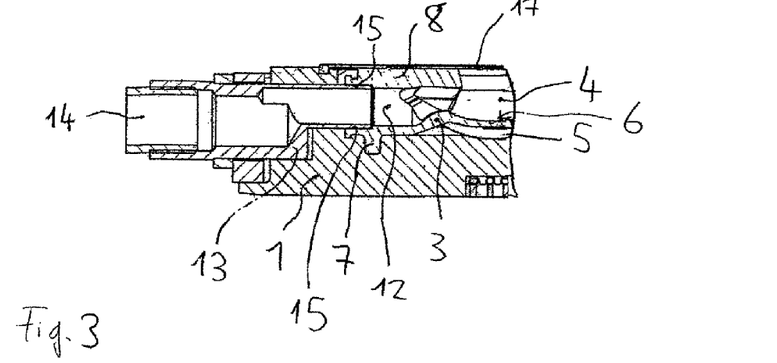
FIG. 3 shows a second sectional view of the peripheral region of the exemplary embodiment of the filter plate according to the invention which comprises an exemplary embodiment of the membrane according to the invention.
Figure 4:
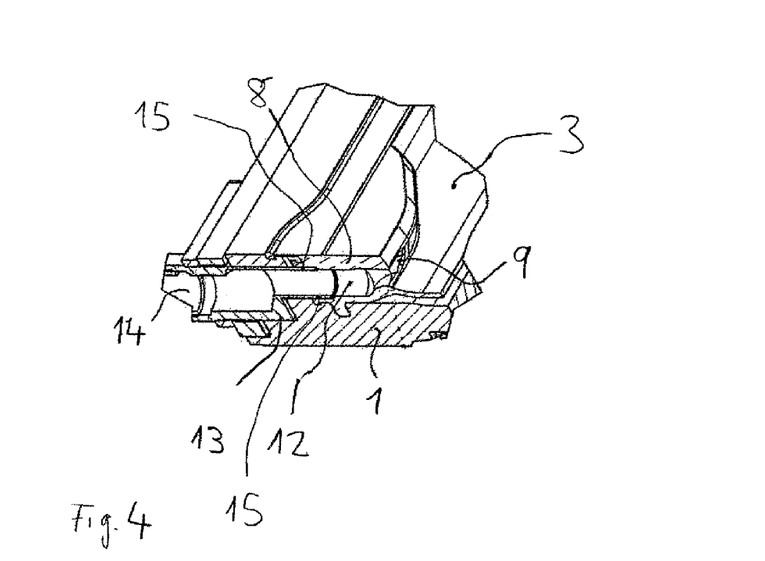
FIG. 4 shows a perspective section of the filter plate shown in FIG. 1.
Figure 5:
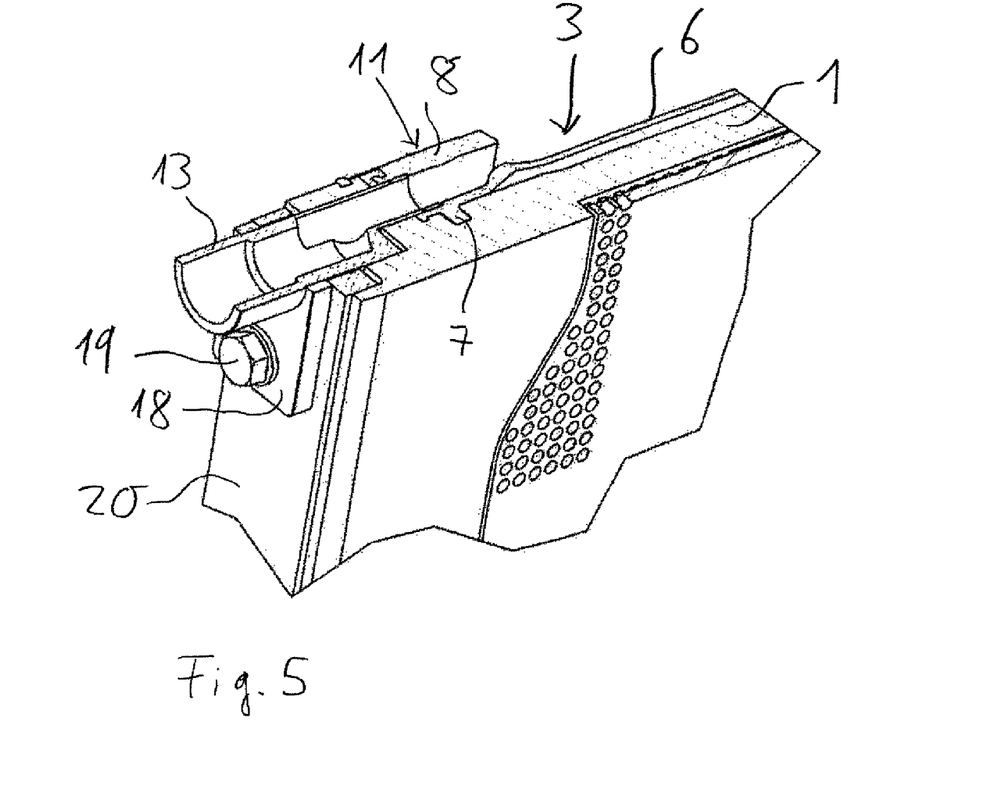
FIG. 5 shows a further perspective section of the filter plate shown in FIG. 1.
Figure 6:
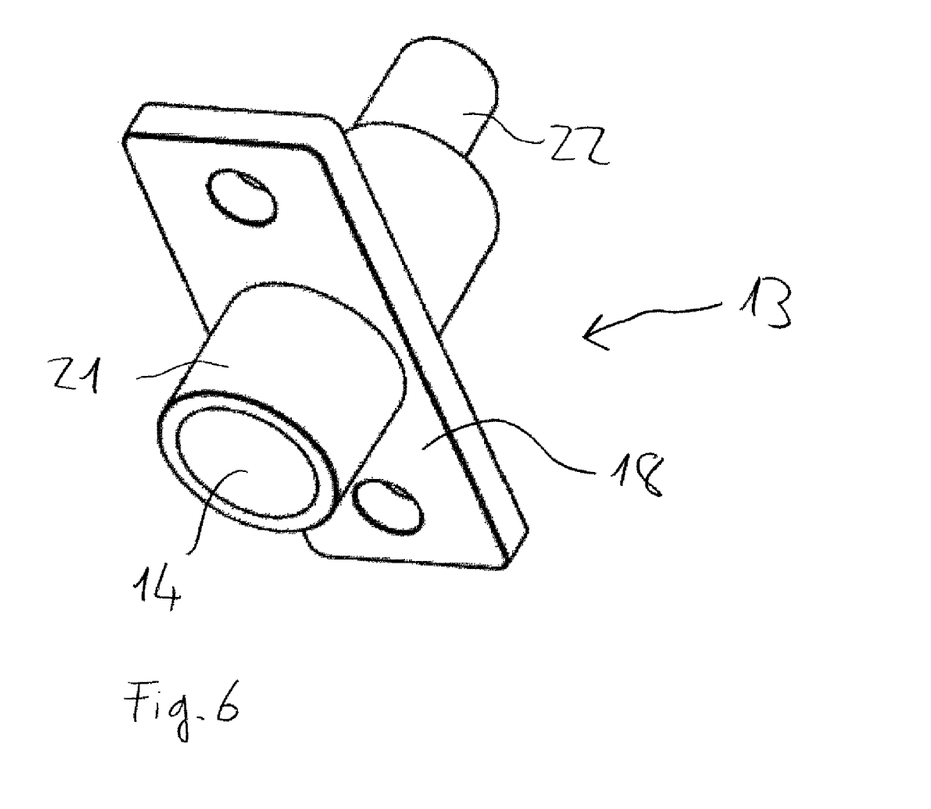
FIG. 6 shows a perspective view of the connection element of the filter plate shown in FIG. 1.

The connection element 13 is shown in detail in FIG. 6. It comprises a first tube piece 21 having a comparatively large diameter and a second tube piece 22 having a comparatively small diameter. The first tube piece 21 is received between the two filter plates 1 and 2. The second tube piece 22 is received in a sealed manner in the membrane duct 10. In the case of the first tube piece 21, the connection element 13 furthermore comprises a fastening plate 18. By way of this plate 18 the connection element 13 is fastened by means of fastening screws 19 (see FIG. 5) on an end plate 20 of the filter plate 1. In general a connection element 13 may be disposed on one or more narrow sides of the filter plates 1 and 2.

Figure 7:
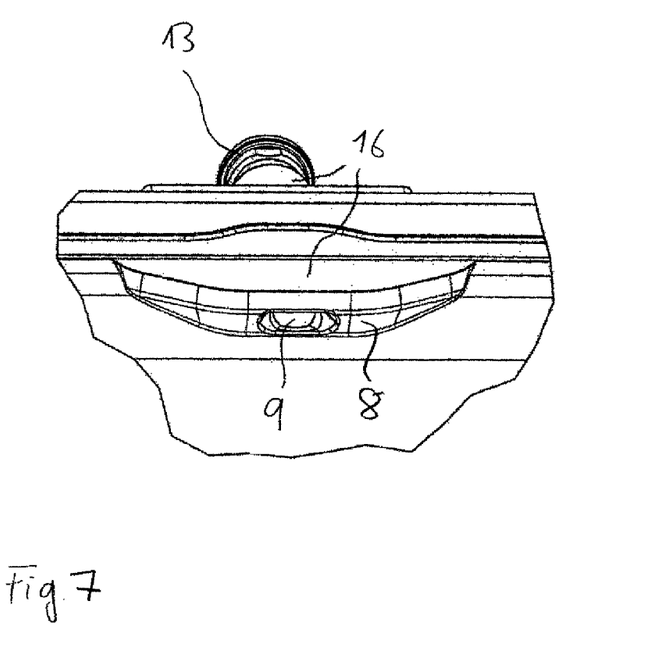
FIG. 7 shows a perspective view of a part of the filter plate shown in FIG. 1, in a view from the direction of the filter chamber.
Figure 8:
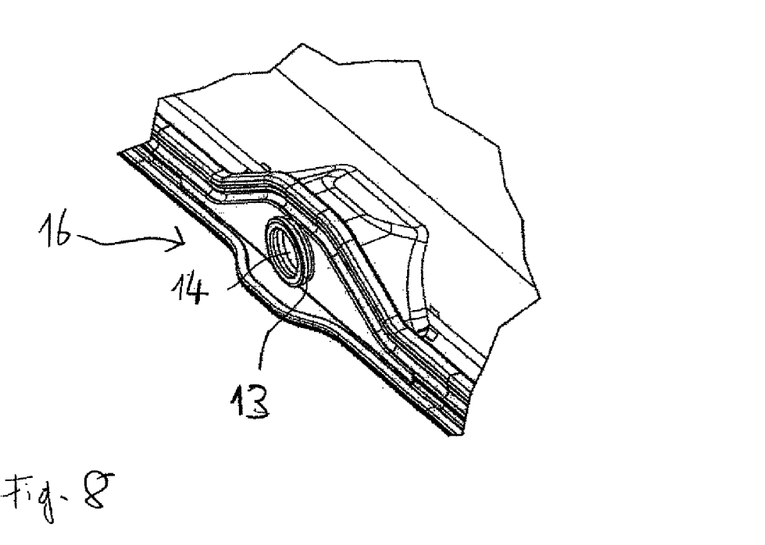
FIG. 8 shows a perspective view of a part of the filter plate shown in FIG. 1, in a view from the outside onto the peripheral region of the filter plate.

In FIGS. 7 and 8 the inlet unit 16 with the connection element 13, the mouth opening 14 and the duct element 8 and the opening 9 into the filter chamber 4 are shown in a perspective manner. If a plurality of inlet units 16 are provided for a filter chamber 4 on the periphery of the filter plates 1 and 2, the membrane 3 for each inlet unit 16 displays one duct element 8 having a membrane duct 10 and an opening 9 into the filter chamber 4.

For filling the filter chamber 4, sludge is conducted in via the mouth opening 14 through the connection element 13. The sludge exits from the connection element 13 and enters into the membrane duct 10 of the membrane 3. This supply duct 12 of the connection element 13 is thus continued within the membrane 3, specifically by way of the membrane duct 10 in the duct element 8 of the membrane 3. At the opening 9 the sludge then enters into the filter chamber 4. Sealing of the ducts 10 and 12 which conduct the sludge, and sealing between these ducts 10 and 12, on the one hand, and the compression-means chamber 5, on the other hand, takes place here within the periphery of the filter plates 1 and 2.

LIST OF REFERENCE SIGNS

1 first filter plate
2 second filter plate
3 membrane
4 filter chamber
5 compression-means chamber
6 compression face of the membrane
7 fastening means of the membrane
8 duct element of the membrane
9 opening of the membrane
10 membrane duct
11 face of the duct element
12 duct of the connection element
13 connection element
14 mouth opening
15 seal
16 inlet unit
17 filter cloth
18 fastening plate
19 fastening screws
20 end plate of the filter plate
21 first tube part
22 second tube part Having described the invention, the following is claimed:

1. A membrane for a membrane filter plate, comprising:
an elastic compression face, and
a peripheral fastening means,
wherein
an opening for fluid communication into a filter chamber is configured in the membrane to provide an integrated inlet for receiving sludge,
the membrane further comprises a duct element which extends from a plane (E) formed by the membrane and in which the opening is configured, the duct element configured so as to be integral with the compression face and/or the peripheral fastening means,
the duct element and the compression face and/or the peripheral fastening means are composed of the same material, and
the peripheral fastening means is an encircling bead which extends in a direction which is perpendicular to the plane (E), said bead adapted to be received in a groove of the membrane filter plate to fasten the membrane to the membrane filter plate.

2. The membrane as claimed in claim 1, wherein the duct element is disposed in a peripheral region of the membrane.

3. The membrane as claimed in claim 1, wherein the duct element with respect to the plane (E) formed by the membrane is configured so as to be opposite the fastening means.

4. The membrane as claimed in claim 1, wherein a membrane duct is formed in the duct element, the membrane duct opens out in said opening thereby allowing liquid to be conductible into the filter chamber or from the filter chamber.

5. The membrane as claimed in claim 1, wherein the membrane includes a plurality of said openings and/or a plurality of said duct elements for fluid communication into the filter chamber.

6. A membrane filter plate comprising:
a membrane including:
an elastic compression face, and
a peripheral fastening means,
wherein
an opening for fluid communication into a filter chamber is configured in the membrane to provide an integrated inlet for receiving sludge,
the membrane further comprises a duct element which extends from a plane (E) formed by the membrane and in which the opening is configured, the duct element configured so as to be integral with the compression face and/or the peripheral fastening means,
the duct element and the compression face and/or the peripheral fastening means are composed of the same material, and
the peripheral fastening means is an encircling bead which extends in a direction which is perpendicular to the plane (E), said bead adapted to be received in a groove of the membrane filter plate to fasten the membrane to the membrane filter plate.

7. An arrangement of at least a first filter plate and a second filter plate, said arrangement comprising:
a membrane including:
an elastic compression face, and
a peripheral fastening means,
wherein
the membrane includes a duct element extending from a plane (E) formed by the membrane, an opening configured in the duct element for fluid communication into a filter chamber, wherein the duct element is configured so as to be integral with the compression face and/or the peripheral fastening means, the duct element and the compression face and/or fastening means being composed of the same material,
a connection element is received by the duct element, wherein the connection element does not delimit the filter chamber,
wherein:
said membrane is fastened on the first filter plate by means of the peripheral fastening means such that a compression means chamber is formed between the membrane and the first filter plate,
the second filter plate bears on the first filter plate such that a filter chamber is formed between the compression face of the membrane and the second filter plate, and
at a periphery of the first and second filter plates, a supply duct is formed between the first and second filter plates, said supply duct in fluid communication with the opening of the membrane, such that liquid is introducible into the filter chamber from outside through the supply duct via the opening of the membrane, or, from the filter chamber through the opening of the membrane and the supply duct, liquid is conductible out of the filter chamber.

8. The arrangement as claimed in claim 7, wherein the connection element is disposed so as to be sealed in a membrane duct formed within the duct element.

9. The arrangement as claimed in claim 7, wherein the connection element has a mouth opening at narrow sides of the first and second filter plates.

\* \* \* \* \*